United States Patent
Barton et al.

(10) Patent No.: US 8,632,886 B2
(45) Date of Patent: Jan. 21, 2014

(54) SOLAR CONTROL GLAZING

(75) Inventors: Neil Barton, St. Helens (GB); Ashley Carl Torr, Ormskirk (GB)

(73) Assignees: Pilkington PLC, St. Helens Merseyside; Pilkington Automotive Limited, St. Helens Merseyside ( * ) Notice: Subject to any disclaimer, the term of this patent is extended or adjusted under 35 U.S.C. 154(b) by 0 days.

(21) Appl. No.: 13/107,348

(22) Filed: May 13, 2011

(65) Prior Publication Data

US 2011/0217535 A1    Sep. 8, 2011

Related U.S. Application Data

(62) Division of application No. 10/563,917, filed as application No. PCT/GB2004/002997 on Jul. 9, 2004, now Pat. No. 7,943,246.

(30) Foreign Application Priority Data

Jul. 11, 2003 (GB) .................................. 0316248.4
Jun. 18, 2004 (GB) .................................. 0413651.1

(51) Int. Cl.
*B32B 15/04* (2006.01)
*B32B 17/06* (2006.01)

(52) U.S. Cl.
USPC ........... 428/432; 428/433; 428/689; 428/699; 428/701; 428/702

(58) Field of Classification Search
USPC ......... 428/428, 432, 433, 434, 689, 699, 701, 428/702

See application file for complete search history.

(56) References Cited

U.S. PATENT DOCUMENTS 3,514,175 A *  5/1970  Jenkins .......................... 359/359
4,584,236 A    4/1986  Colmon et al.
(Continued)

FOREIGN PATENT DOCUMENTS

DE   196 36 301 A1   3/1997
EP   0 482 535 A1    4/1992
(Continued)

OTHER PUBLICATIONS

English translation of Japanese Notification of Reasons for Refusal dated Jun. 14, 2011 issued in the corresponding Japanese Patent Application No. 2006-519990.

*Primary Examiner* — David Sample
*Assistant Examiner* — Lauren Colgan
(74) *Attorney, Agent, or Firm* — Buchanan Ingersoll & Rooney PC

(57) ABSTRACT

A vehicle glazing comprises a pane of tinted glass, tinted by at least 1.0 to 1.8% wt. of total iron, having a low emissivity coating on its interior surface. The coating has an emissivity from 0.05 to 0.4 and may include a transparent conductive oxide (and optionally a dopant), or a metal layer and at least one dielectric layer. The glass is preferably toughened glass. According to another aspect, a laminated glazing includes two plies of glass, with a sheet of interlayer material laminated between the two glass plies, and wherein at least one ply of glass or the sheet of interlayer material is body tinted. The glazing has a low emissivity coating on its interior surface, the inner ply may be clear glass or tinted glass, and the interlayer material may be clear PVB or tinted PVB, and may further be infra-red reflecting. Either of the glazings may be used as a roof or other vehicle glazing.

20 Claims, 2 Drawing Sheets

(56) References Cited

U.S. PATENT DOCUMENTS

| | | | |
|---|---|---|---|
| 4,910,088 A | | 3/1990 | Baudin et al. |
| 4,968,563 A | * | 11/1990 | Thomas et al. ............... 428/432 |
| 5,308,805 A | * | 5/1994 | Baker et al. .................... 501/71 |
| 5,324,374 A | | 6/1994 | Harmand et al. |
| 5,352,640 A | * | 10/1994 | Combes et al. ................. 501/71 |
| 5,372,977 A | | 12/1994 | Mazon-Ramos et al. |
| 5,418,025 A | | 5/1995 | Harmand et al. |
| 5,545,596 A | * | 8/1996 | Alvarez Casariego et al. . 501/71 |
| 5,582,455 A | * | 12/1996 | Casariego et al. ......... 296/146.2 |
| 5,650,365 A | | 7/1997 | Higby et al. |
| 5,786,289 A | | 7/1998 | Harmand et al. |
| 5,932,502 A | * | 8/1999 | Longobardo et al. ........... 501/70 |
| 6,080,695 A | * | 6/2000 | Scheffler-Hudlet et al. .... 501/71 |
| 6,084,702 A | | 7/2000 | Byker et al. .................... 359/288 |
| 6,150,028 A | * | 11/2000 | Mazon ........................... 428/426 |
| 6,446,402 B1 | * | 9/2002 | Byker et al. ................. 52/173.3 |
| 6,466,298 B1 | | 10/2002 | Fix et al. |
| 6,538,192 B1 | | 3/2003 | Coster et al. |
| 6,927,186 B2 | * | 8/2005 | Hulme et al. ................... 501/70 |
| 6,953,759 B2 | * | 10/2005 | Landa et al. .................... 501/71 |
| 7,005,182 B1 | | 2/2006 | Hecq et al. |
| 2002/0025899 A1 | | 2/2002 | Higby et al. |
| 2002/0136905 A1 | * | 9/2002 | Medwick et al. .............. 428/432 |
| 2002/0172775 A1 | * | 11/2002 | Buhay et al. ................. 427/376.2 |
| 2004/0219368 A1 | * | 11/2004 | Coster et al. .................. 428/432 |
| 2006/0182980 A1 | * | 8/2006 | Barton et al. .................. 428/432 |

FOREIGN PATENT DOCUMENTS

| | | |
|---|---|---|
| EP | 0 616 883 A2 | 9/1994 |
| EP | 0 983 972 A2 | 3/2000 |
| EP | 0 994 081 A1 | 4/2000 |
| EP | 1 002 773 A1 | 5/2000 |
| EP | 1 004 550 A1 | 5/2000 |
| EP | 1 201 616 A2 | 5/2002 |
| EP | 1 288 174 A1 | 3/2003 |
| GB | 1002024 A | 8/1965 |
| GB | 2 264 259 A | 8/1993 |
| GB | 2 289 273 A | 11/1995 |
| JP | 58-140344 A | 8/1983 |
| JP | 60-104411 A | 6/1985 |
| JP | 61-035835 U | 3/1986 |
| JP | 63-242948 A | 10/1988 |
| JP | 04-275943 A | 10/1992 |
| JP | 05-330847 A | 12/1993 |
| JP | 6-345489 A | 12/1994 |
| JP | 7-118037 A | 5/1995 |
| JP | 07-138049 A | 5/1995 |
| JP | H07-508971 A | 10/1995 |
| JP | 09-030832 A | 2/1997 |
| JP | 09-110464 A | 4/1997 |
| JP | 09-208229 A | 8/1997 |
| JP | H11-512694 A | 11/1999 |
| JP | 2000-159546 A | 6/2000 |
| WO | WO 91/07356 A1 | 5/1991 |
| WO | WO 98/34883 A1 | 8/1998 |
| WO | WO 99/28258 A1 | 6/1999 |
| WO | WO 00/27771 A1 | 5/2000 |
| WO | WO 00/37373 A1 | 6/2000 |
| WO | WO 01/02167 A1 | 1/2001 |
| WO | WO 03/020656 A1 | 3/2003 |
| WO | WO 2005/115747 A1 | 12/2005 |

* cited by examiner

SOLAR CONTROL GLAZING

This application is a divisional of U.S. application Ser. No. 10/563,917 having a filing date of Jan. 10, 2006, which is a U.S. national stage application based on International Application No. PCT/GB20004/002997 having a filing date of Jul. 9, 2004 and which claims priority to U.K. Application No. 0316248.4 filed on Jul. 11, 2003 and U.K. Application No. 0413651.1 filed on Jun. 18, 2004, the entire content of all four of which is incorporated herein by reference.

TECHNOLOGICAL FIELD

The present invention relates to a vehicle glazing, especially to a solar control vehicle glazing, which is coated and tinted, and which may further be incorporated into a laminated glazing also for use in a vehicle.

BACKGROUND DISCUSSION

Tinted glazings having a coating on one of their surfaces to impart solar control properties to said glazing are known, particularly glazings of this type which are intended for architectural use. One such glazing is described in EP 1 004 550 A1 and is referred to as a heat-reflecting glass suitable for use in windows of buildings, especially in double glazing units. The glass substrate is coated with at least one layer of a film mainly comprising silicon. The resultant heat-reflecting glass thus has low visible light reflectance and a green, bronze or grey reflected colour tone.

U.S. Pat. No. 6,538,192 B1 describes a tinted, coated glazing for use in the roof of a vehicle. It particularly describes a laminated roof glazing comprising an outer pane of "extra clear" glass (typically having a total iron content less than 0.1% by weight), a laminating interlayer accommodating an array of photovoltaic cells which cover only a portion of said glazing, and an inner pane of tinted (and optionally coated) glass. The outer pane of extra clear glass has maximized energy transmission to allow the proper functioning of the photovoltaic cells, whilst the inner pane is tinted, and optionally coated with an athermic coating, to specifically reduce the maximized energy transmission through the portion of the glazing not covered by the photovoltaic array, thereby increasing vehicle passenger comfort. The optional coating is provided on the surface of the inner pane of tinted glass facing into the laminate such that it is in contact with the interlayer. In this position, the coating is devoid of contact with the environment external to the glazing, and is protected from degradation and abrasion.

The laminated roof glazing described in U.S. Pat. No. 6,538,192 B1 has a specific purpose; namely to reduce the energy drain on a vehicle's power source by using, and aptly locating, photovoltaic cells in the glazing. The purpose for which the laminated glazing is intended therefore dictates the requirements for a high energy transmission (i.e. greater than 80%) outer pane of glass, and a tinted inner pane of glass which thereby compensates for the increased energy transmission (compared to standard clear glass) of the outer glass.

It would be desirable to provide a vehicle glazing that reduces the amount of energy, especially heat energy, in the form of incident solar radiation which would otherwise be transmitted through said glazing.

It would be especially desirable to provide a laminated glazing for use in a vehicle, that reduces the amount of energy, especially heat energy, in the form of incident solar radiation which would otherwise be transmitted through said glazing.

SUMMARY

We have found that such vehicle glazings may be achieved by providing a pane of glass which is tinted by use of at least iron, and a low emissivity coating on one of the surfaces of the glazing.

According to a first aspect of the present invention there is provided a vehicle glazing comprising a pane of tinted glass, said glass having a colourant portion including 1.0 to 1.8% (by weight of the glass) of total iron (calculated as $Fe_2O_3$), 100 to 270 ppm by weight of cobalt oxide (calculated as $CO_3O_4$) and selenium (calculated as Se) in an amount less than 20 ppm by weight, and a low emissivity coating on the interior surface of the pane. By "the interior surface" of the pane of glass is meant the surface of that pane which would form an interior surface of the vehicle into which the glazing may be fitted.

The total iron content of the glass plays an important role in determining both the level of absorption of incident energy achieved by the glazing, and also the overall tint of the glazing. The total iron content is more preferably in the range from 1.3 to 1.6% by weight. The tint exhibited by the glazing is preferably a grey, blue or green tint (although a bronze tint is also envisaged), and is further preferably a dark tint (i.e. the glazing has a visible light transmission of 50% or less).

Cobalt oxide serves to reduce the visible light transmission of the glass in which it is present, and is more preferably included in the glass in the range from 150 to 230 ppm by weight. Selenium aids achievement of a bronze to grey tone when in existence with cobalt.

The coating usually includes a metal or metal oxide layer and, in the latter case, the layer may also include a dopant material, for example, fluorine or antimony. A number of low emissivity coatings are known in the art, any of which may be used in accordance with the present invention. The emissivity of a particular coating refers to the tendency of that coating to radiate energy. Thus a low emissivity coating is a poor thermal radiator (compared to a blackbody entity, which is a perfect radiator and is defined as having an emissivity of unity). Low emissivity coatings may be provided as one of two principal types: "hard" or "pyrolytic" coatings and off-line coatings which are normally produced by sputtering, and are commonly softer than typical pyrolytic coatings.

A hard coating may be deposited in an "on-line" process, in which the coating is pyrolytically deposited onto the surface of float glass during its formation, in known manner, for example by use of a chemical vapour deposition process. Generally, deposition occurs in the region of a float line where the glass ribbon is at a temperature of between 400 and 760° C.; glass of this temperature may be found towards the exit of the tin bath, in the lehr gap (i.e. in the gap between the tin bath and the annealing lehr) and in the hot-end of the annealing lehr. As the glass is fully annealed (i.e. sequentially cooled from its higher temperature state to room temperature), the coating is cured, thus the coating species which initially fused to the glass surface via pyrolysis effectively forms part of the final glass product. The coated side of the glass may be further subjected to a polishing process to reduce the microscopic rugosity of the coated surface to produce a glass that may be more easily handled.

An off-line coating is one that is deposited onto the surface of a piece of glass subsequent to complete manufacture of the glass, i.e. in a separate process from the float process. Hence the deposition process is an "off-line" process. Off-line coatings include sputtered coatings which are deposited, for example by use of a magnetic sputtering technique under vacuum conditions.

The low emissivity coating present on the glass used in the glazing of the present invention will normally be such that when used on 3 mm clear float glass, the coated glass has an emissivity in the range from 0.05 to 0.45; the actual value being measured according to EN 12898 (a published standard of the European Association of Flat Glass Manufacturers); coatings resulting (when used in 3 mm clear float glass) in an emissivity less than 0.3 are preferred. Hard coatings generally have emissivities greater than 0.15 (and preferably less than 0.2), whilst off-line coatings, normally sputtered coatings, generally have emissivities greater than 0.05 (and preferably less than 0.1). In both cases, the emissivities may be compared with the assumed normal emissivity of clear uncoated glass, which has a value of around 0.89.

A hard (or pyrolytic) low emissivity coating may comprise a single layer of metal oxide, which is preferably a transparent conductive oxide. Oxides of metals such as tin, zinc, indium, tungsten and molybdenum may be comprised in the single layer of metal oxide. Usually the coating further comprises a dopant, for example fluorine, chlorine, antimony, tin, aluminum, tantalum, niobium, indium or gallium, so that coatings such as fluorine-doped tin oxide and tin-doped indium oxide may result. Typically, such coatings are provided with an underlayer e.g. comprising a silicon oxide or silicon oxynitride which serves either as a barrier to control migration of alkali metal ions from the glass and/or as a colour suppressing layer to suppress iridescent reflection colours resulting from variations in thickness of the low emissivity layer.

Off-line low emissivity coating typically comprise a multilayer coating stack which normally includes a metal layer (or a conductive metal compound) and at least one dielectric layer. The multilayer stack structure may be repeated to further enhance the emissivity of the coating. Amongst other similar metals, silver, gold, copper, nickel and chromium may be used as the metal layer in a multilayer stack; indium oxide, antimony oxide or the like may be used as the conductive metal compound. Coatings comprising one or two layers of silver interleaved between layers of a dielectric such as an oxide of silicon, aluminum, titanium, vanadium, tin or zinc are typical multilayer stacks. Generally the one or more layers from which the coating is formed are of the order of tens of nanometers in thickness.

The glass used in the glazing of the present invention may be flat or it may be curved, and in addition it may be toughened, for example by thermal or chemical tempering. When the glass is subjected to a heat treatment process, for example tempering or bending, this may be before or after deposition of the low emissivity coating. Should the heat treatment process occur after deposition of the coating, the coating should be one which is not degraded by the exposure to elevated temperature.

Usually the glass will be in a thickness of 8 mm or less (yet greater than 1.5 mm), however a thickness in the range from 2 mm to 6 mm is preferred.

The pane of tinted glass used in the glazing of the present invention generally has a clear base glass composition in the range (by weight):

| | |
|---|---|
| $SiO_2$ | 68-75% |
| $Al_2O_3$ | 0-5% |
| $Na_2O$ | 10-18% |
| $K_2O$ | 0-5% |
| MgO | 0-10% |
| CaO | 5-15% |
| $SO_3$ | 0-2% |

The glass may also contain other additives, for example, refining aids, which would normally be present in an amount of up to 2%.

Normally the glass used in the glazing has a ferrous oxide content (calculated as FeO) in the range 0.05 to 1.6% by weight. Absorption of total energy that is incident on the glazing (especially that which is incident on the uncoated surface of the glazing), in particular heat energy in the form of IR radiation, may be achieved by regulating the ferrous oxide content of the glazing. Preferably the ferrous oxide content is greater than 0.4% by weight, further preferably greater than 0.8% by weight and most preferably greater than 1.2% by weight. The higher the ferrous oxide content of the glass, the more total energy is absorbed by the glass, particularly near infra red ("NIR") radiation, which is IR radiation of comparatively short wavelength and thus high energy. The relationship between radiation of a specific wavelength (λ) and its corresponding energy (E) is given by:

$$E = \frac{hc}{\lambda}$$

where h is Planck's constant and c is the speed of light.

Solar energy absorbed by the glass, however, does not remain absorbed; it is re-radiated by the glass over a different wavelength range than that of the incident energy and in all directions, thus at least some radiation is directed away from the low emissivity coating whilst some is directed towards it. The re-radiated energy includes an IR component of longer wavelength and thus lower energy than the incident NIR component. The low emissivity coating is a poor radiator of long wavelength IR radiation and therefore reduces the total amount of energy passing into a vehicle glazed with a solar control glazing of the present invention.

Advantageously, the glass used in the glazing has a nickel content (calculated as NiO) in the range up to 500 ppm, and preferably it is greater than 55 ppm, further preferably greater than 100 ppm and most preferably greater than 200 ppm. Nickel is an ingredient that is added to a glass composition to achieve a grey to brown colour tone.

Normally the glazing has a visible light transmission of 50% or less. The visible light transmission of a glazing is measured using C.I.E. Illuminant A ("$LT_A$") over the wavelength range 380 nm to 780 nm at 5 nm intervals from the uncoated side of the glazing. The darker the tint of the glazing however, the less visible light is transmitted; transmission of 36% or less, still less 28%, and further 20% or less, is thus preferred. In Europe, legislation dictates that a vehicle windscreen must have not less than 75% visible light transmission (whereas legislation in the United States requires not less than 70%). Front passenger door glasses in both Europe and the United States are required to have not less than 70% visible light transmission; all other vehicle glass (for example a backlight or a sunroof) may have less than 70%. Thus a glazing according to the first aspect of the present invention finds use as a rear passenger door glass, a backlight glass and a rooflight glass, but not as a front passenger door glass nor as a windscreen.

The glazing preferably has a transmitted energy of 30% or less, when measured at Air Mass 2, ISO 9050. Further preferably the glazing has a transmitted energy of less than 20% and most preferably less than 10%. Transmitted energy ("TE"), also known as direct solar heat transmission ("DSHT") is measured at Air Mass 2 (simulating rays from the sun incident at an angle of 30° to the horizontal) over the wavelength range 350 to 2100 nm at 50 nm intervals. The low emissivity coating appears to be successful in suppressing the re-radiated energy, especially lower energy IR radiation (in addition to incident lower energy IR radiation), thereby reducing the amount of heat transmitted through said glazing.

Absorption of higher energy IR radiation followed by at least partial reduction of re-radiated lower energy IR radiation by the glazing is especially desirable to vehicle manufacturers in our current commercial climate. Achievement of superior vehicle passenger comfort, for example by minimizing the heat gain in the interior of a vehicle, and reduced demand on the resources of a vehicle, for example by reducing the need to use air-conditioning systems and the like, is a high priority for today's vehicle manufacturers.

As discussed earlier, the low emissivity coating used in the present invention is provided on the interior surface of the pane of tinted glass, in which position it may reduce the level of IR radiation from the sun that passes through the glazing (including the re-radiation of longer wavelength radiation that is the direct result of absorption of shorter wavelength IR radiation that is incident on the uncoated surface of said glazing). This effect is likely to have most utility during summer months when the amount of solar radiation that is incident on a glazing will usually be at its greatest.

However, the coated, tinted glazing of the present invention has additional benefits. During winter months in particular, when heating of the interior of a vehicle is necessary, for example to de-mist the windows of the vehicle, the low emissivity coating (which is on the surface of the glazing facing into the vehicle) may also inhibit the escape of heat radiation from inside the vehicle to the environment external to the vehicle. Minimizing the amount of heat loss from a vehicle may serve to reduce the "cold-shoulder effect". This effect essentially characterizes the localized coolness in temperature that may be felt by a passenger in a vehicle positioned close to a window, most often a side glazing. The cold-shoulder effect is a result of a vehicle's tendency to lose heat to the outside world, particularly via it's windows and especially on a cold day. A low emissivity coating may reduce this heat loss by reflecting longer wavelength (lower energy) IR radiation back into the vehicle, where it may heat the localized cool air close to the windows.

The advantages or the invention may be achieved with a wider range of tinted glass compositions, or indeed using a tinted interlayer with clear and/or tinted glass plies, and a laminated construction.

According to a second aspect of the invention, there is provided a laminated glazing, for use in a vehicle, comprising two plies of glass with a sheet of interlayer laminated therebetween, wherein at least one ply of glass or the sheet of interlayer material is body tinted, and a low emissivity coating on the interior surface of the glazing.

The vehicle glazing according to the invention may be a windscreen, sidelight or backlight, but the constructions according to the invention are particularly useful for use in rooflights (roof glazings) which are clearly subject to more intense solar radiation when the suns heat is most intense (i.e. when it is highest in the sky), and which may be located very close to the driver and passenger's persons.

Surprisingly, the use of a low emissivity coating is not found, to lead to an unacceptable build up of heat trapped in the vehicle; indeed with modern vehicles, equipped with air conditioning, this is unlikely to be a problem and, with or without air conditioning, is much less significant than the discomfort which results from high levels of thermal radiation transmitted through or re-radiated by the glazing onto the vehicle occupants.

According to one preferred aspect of the present invention a laminated glazing, for use in a vehicle, comprises a ply of tinted glass, said glass having a colourant portion including 0.5 to 4.0% (by weight of the glass) of total iron (calculated as $Fe_2O_3$), a further ply of glass and a sheet of interlayer material laminated therebetween, and a low emissivity coating on the interior surface of the glazing.

According to a further preferred aspect of the present a laminated glazing, for use in a vehicle, comprises an outer ply of glass, an inner ply of glass and a sheet of body-tinted interlayer material laminated therebetween, and a low emissivity coating on the interior surface of the glazing.

By "the interior surface" of the laminated glazing is meant the exposed surface of said glazing which faces into a vehicle into which the glazing may be fitted (i.e. the external surface of the inner ply). If conventional surface-numbering terminology is used, wherein the surface of the laminate which contacts the environment external to a vehicle is known as surface 1 and the surface which contacts the internal environment is known as surface 4, then the coating is supported on surface 4 (the performance of a low emissivity coating is currently much better on surface 4 than it is on either surface 2 or surface 3).

Typically the ply of tinted glass is the outer ply of the laminate (with respect to the interior of a vehicle into the glazing may be fitted) and the further ply of glass, which may be clear glass or tinted glass, is the inner ply, although the reverse situation is also possible.

Such glazing is optimally provided in a thickness of 10 mm or less (yet greater than 3 mm), however a thickness in the range from 4 mm to 7 mm is preferred. Furthermore, each ply comprised in the laminate is advantageously of thickness in the range from 1.5 mm to 5 mm, although 2 mm to 3.5 mm is preferred.

The sheet of interlayer material is often a sheet of transparent plastic, for example polyvinylbutyral or such other suitable laminating material, and is ordinarily provided in a thickness of 0.76 mm. Alternatively the sheet of interlayer material may be tinted to have an optimum visible light transmission of 35% or less, preferably 18% or less. Furthermore, the sheet of interlayer material may absorb infra-red radiation, for example when it comprises tin-doped indium oxide. By describing a sheet of interlayer material as being "infrared absorbing" it is meant that when such a sheet (in 0.76 mm thickness) is interleaved between two pieces of clear glass (each of 2.1 mm thickness), the resulting laminate has a selectivity greater than 0.5 and preferably greater than 1, where the "selectivity" is calculated by dividing the percentage visible light transmission by the percentage total energy, i.e. $LT_A/TE$, each measured for the laminate.

The total iron content of the ply of tinted glass may preferably be in the range from (in percentages by weight of the glass) 0.8 to 2.0, further preferably from 1.0 to 1.8 and most preferably from 1.3 to 1.6. The ply of tinted glass may also include other colourant components, for example one or more of cobalt oxide (calculated as $CO_3O_4$) in the range from 5 to 350 ppm by weight of the glass (preferably 40 to 320, more preferably 100 to 270 and most preferably 150 to 230), nickel oxide (calculated as NiO) in an amount up to 500 ppm by weight of the glass (preferably greater than 55, more preferably greater than 100 and most preferably greater than 200) and selenium in an amount up to 70 ppm by weight of the glass (preferably less than 55, more preferably less than 35 and most preferably less than 20).

The further ply of glass, on a surface of which the low emissivity coating is provided, may be clear glass ("Option A") whose composition may include, for example (by weight), 72.1% $SiO_2$, 1.1% $Al_2O_3$, 13.5% $Na_2O$, 0.6% $K_2O$, 8.5% CaO, 3.9% MgO, 0.2% $SO_3$ and optionally up to 0.2% $Fe_2O_3$ (preferably less than 0.15%), or it may be tinted glass ("Option B") which has a colourant portion including 0.5 to 4.0% (by weight of the glass) of total iron (calculated as $Fe_2O_3$), 0.05 to 1.6% by weight of ferrous oxide (calculated as FeO), 5 to 350 ppm by weight of cobalt oxide (calculated as $CO_3O_4$), a visible light transmission of 75% or less and a transmitted energy of 45% or less at 2.1 mm.

The total iron content of the further ply of glass, when tinted, is preferably in the range (% by weight) from 0.8 to 2.0, further preferably from 1.0 to 1.8 and most preferably from 1.3 to 1.6. Similarly, the cobalt content is preferably in the range from 40 to 320 ppm, further preferably from 100 to 270 ppm and most preferably from 150 to 230 ppm. Ordinarily, if tinted, the further ply of glass may be grey, blue or green tinted, or possibly even bronze tinted glass. The ferrous oxide content of the further ply of glass is typically greater than 0.4% by weight, preferably greater than 0.8% by weight and more preferably greater than 1.2% by weight.

Usually the further ply of glass has a visible light transmission of 55% or less, although 36% or less, and still further 20% or less, is preferred, whilst the transmitted energy is advantageously less than 30%, and furthermore less than 21%.

The laminated glazing preferably has a visible light transmission of 35% or less, further preferably of 18% or less and most preferably of 10% or less. Advantageously, the laminated glazing has a transmitted energy of 20% of less. Of further advantage is transmitted energy of 15% or less, and further still, of 11% or less.

Further alternatively the further ply of glass of the laminated glazing may be tinted glass ("Option C") which has a colourant portion including 0.4 to 4.0% (by weight of the glass) of total iron (calculated as $Fe_2O_3$), 0.05 to 1.6% by weight of ferrous oxide (calculated as FeO), and a visible light transmission of 82% or less and a transmitted energy of less than 60% when measured at a glass thickness of 3.9 mm (the visible light transmission is 88% or less and the transmitted energy 72% or less when measured at a glass thickness of 2.1 mm).

The total iron content of such a tinted ply of glass is preferably in the range (expressed as percentage by weight) from 0.45 to 2.0, further preferably from 0.5 to 1.5 and most preferably from 0.58 to 1.1. The ferrous oxide content (expressed as FeO) is preferably greater than 0.07%, further preferably greater than 0.09% and most preferably greater than 0.1%.

Typically, such a ply of tinted glass has a green colouration. It may have a visible light transmission of less than 80% in 3.9 mm thickness (less than 87% in 2.1 mm thickness), whilst the transmitted energy may advantageously be less than 57% in 3.9 mm thickness (less than 70% in 2.1 mm thickness).

A laminated glazing incorporating a ply glass tinted according to Option C above as its "further ply" typically has a visible light transmission greater than 70%, possibly greater than 75%, and a transmitted energy of 60% or less, and preferably 55% or less.

When a body-tinted interlayer material is used, the laminated glazing is optimally provided in a thickness of 10 mm or less (yet greater than 3 mm), however a thickness in the range from 4 mm to 8 mm is preferred. Furthermore, each ply comprised in the laminate is advantageously of thickness in the range from 1.5 mm to 5 mm, although 2 mm to 3.5 mm is preferred.

The sheet of interlayer material is typically a sheet of plastic, for example polyvinylbutyral or other such suitable laminating material, which is tinted to have a visible light transmission of 35% or less at a thickness of 0.76 mm. Preferably the interlayer material is tinted to have a light transmission less than 30% and further preferably less than 25%. Furthermore, the interlayer material typically absorbs infrared radiation, for example when it comprises tin-doped indium oxide, lanthanum hexaboride or other such suitable infra-red radiation absorbing material. The interlayer material may exhibit transmitted energy of 25% or less, preferably 20% or less and most preferably 15% or less.

At least one ply of glass in the laminated glazing may be clear glass whose composition may include, for example (by weight) 72.1% $SiO_2$, 1.1% $Al_2O_3$, 13.5% $Na_2O$, 0.6% $K_2O$, 8.5% CaO, 3.9% MgO, 0.2% $SO_3$ and optionally up to 0.2% $Fe_2O_3$ (preferably less than 0.15%). Alternatively at least one ply of glass may be tinted glass having a colourant portion comprising 0.4 to 4.0% (by weight of the glass) of total iron (calculated as $Fe_2O_3$) and 0.05 to 1.6% by weight of ferrous oxide (calculated as FeO).

The total iron content of such a tinted ply of glass is preferably in the range (% by weight) from 0.50 to 2.0, further preferably from 0.54 to 1.5 and most preferably from 0.56 to 1.1. The ferrous oxide content (expressed as FeO) is preferably greater than 0.09%, further preferably greater than 0.1% and most preferably greater than 0.12%.

A laminated glazing with a tinted interlayer preferably has a visible light transmission of 50% or less, further preferably 40% or less and most preferably 35% or less. Advantageously, the laminated glazing has a transmitted energy of 30% or less, and further still of 20% or less.

Preferably laminated glazings in accordance with the invention, especially laminated glazings for use as roof glazings, exhibit a visible light transmission (LTA) of at least 15%, especially at least 20%, and a total solar heat transmission, not more than 15%, preferably not more than 10%, greater than their light transmission.

A glazing according to the first or second aspects of the invention may be used as a roof glazing in a vehicle. It may be provided either as a conventional sun-roof glazing, or as a glazing that constitutes substantially the entire roof area of a vehicle, which is often referred to as a "full-area roof light". A glazing according to the second aspect of the invention may further be used as a vehicle windscreen when appropriate visible light transmission requirements are met.

BRIEF DESCRIPTION OF THE DRAWING FIGURES

For a better understanding, the present invention will now be more particularly described, by way of non-limiting example, with reference to and as shown in the accompanying drawings wherein.

DETAILED DESCRIPTION

Figure 1:
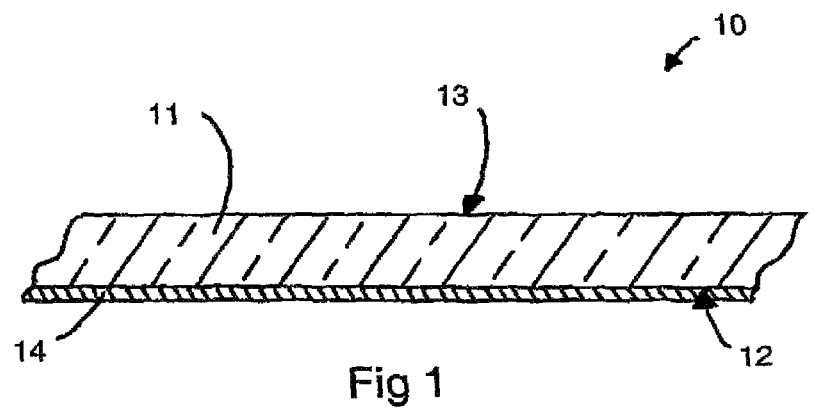
FIG. 1 is a cross sectional view through a vehicle glazing.

Vehicle glazing 10 of FIG. 1 comprises glass pane 11 which has inner surface 12 and outer surface 13 (labeled with respect to a vehicle into which glazing 10 may be fitted). Inner surface 12 is provided with coating 14; coating 14 may be located directly on inner surface 12, or it may be located on one or more further coating layers (not shown) which are located on inner surface 12. Such further coating layers may be barrier layers to protect glazing 10 from species which may otherwise have a tendency to migrate from coating 14 into glazing 10.

Glass pane 11 may be grey glass which has a base glass composition including (by weight) 72.1% $SiO_2$, 1.1% $Al_2O_3$, 13.5% $Na_2O$, 0.6% $K_2O$, 8.5% CaO, 3.9% MgO and 0.2% $SO_3$, and a colourant portion comprising (by weight) 1.45% total iron (calculated as $Fe_2O_3$), 0.30% ferrous oxide (calculated as FeO), 230 ppm $CO_3O_4$, 210 ppm NiO and 19 ppm Se—hereinafter referred to as composition 1. Such a glass is currently available as GALAXSEE™ from Pilkington plc in the United Kingdom.

Coating 14 is a low emissivity coating. When coating 14 has an emissivity, ∈, as shown in Table 1 below, and is provided on glass pane 11 (of composition 1 as described above), resultant glazing 10 exhibits the following properties at the thicknesses specified:

TABLE 1

| Ex. | ∈ | Thickness of glazing 10 | $LT_A$ (%) | TE (%) | TSHT (%) | a* | b* |
|---|---|---|---|---|---|---|---|
| 1 | 0.05 | 5 mm | 9.8 | 5.2 | 19.3 | −7.4 | 4.7 |
| 2 | 0.18 | 5 mm | 11 | 9 | 24.5 | −4.2 | 3.6 |
| 3 | 0.45 | 5 mm | 11 | 9.4 | 28.9 | −4.4 | 2.7 |
| 4 | — | 5 mm | 11.9 | 10.4 | 34.5 | −4.2 | 2.4 |
| 5 | 0.05 | 6 mm | 6.6 | 3.5 | 17.9 | −7.1 | 4.6 |
| 6 | 0.18 | 6 mm | 7.3 | 5.9 | 22.1 | −4.4 | 3.6 |
| 7 | 0.45 | 6 mm | 7.4 | 6.2 | 26.5 | −4.6 | 2.8 |
| 8 | — | 6 mm | 7.9 | 6.9 | 32 | −4.4 | 2.5 |

The total solar heat transmission ("TSHT") of the glazing is the sum of heat that is directly transmitted through the glazing (i.e. TE) and the heat that is absorbed by the glass of the glazing and subsequently re-radiated. The TSHT measurements were taken according to the Society of Automotive Engineers' published standard SAE J1796 at 14 k.p.h. Parameters a* and b* are colour co-ordinates according to the CIELAB system (measured at D65, 2° observer), and are used to define the colour of glazing 10.

Examples 4 and 8 are comparative examples which illustrate prior art versions of glazing 10 which are not provided with coating 14. Examples 1 to 4 and 5 to 8 clearly show that the presence of a low emissivity coating on a pane of the tinted glass in question has a minimal effect on the visible light transmission of the glazing (a maximum drop of 2.1 percentage points is observed at 5 mm and 1.3 percentage points at 6 mm) whilst both the TE and TSHT values of the coated glazings are lower (and in some examples halved) compared to a corresponding un-coated glazing.

Alternatively glass pane 11 may be green glass which has the same base glass composition as glass pane 11 described previously, and a colourant portion comprising (by weight) 1.57% total iron (calculated as $Fe_2O_3$), 0.31% ferrous oxide (calculated as FeO), 115 ppm $CO_3O_4$, 0 ppm NiO and 5 ppm Se—hereinafter referred to as composition 2. Such a glass is currently available as SUNDYM 435™, again from Pilkington plc in the United Kingdom. When coating 14 has an emissivity as shown in Table 2 below, and is provided on glass pane 11 of composition 2, resultant glazing 10 exhibits the following properties at the thicknesses specified:

TABLE 2

| Ex. | ∈ | Thickness of glazing 10 | $LT_A$ (%) | TE (%) | TSHT (%) | a* | b* |
|---|---|---|---|---|---|---|---|
| 9 | 0.05 | 5 mm | 23 | 10.1 | 23.4 | −15.3 | 2.8 |
| 10 | 0.18 | 5 mm | 25.6 | 14 | 28.7 | −11.5 | 1.3 |
| 11 | 0.45 | 5 mm | 25.6 | 14.5 | 32.8 | −11.8 | 0 |
| 12 | — | 5 mm | 27.6 | 15.9 | 38.5 | −11.6 | −0.4 |
| 13 | 0.05 | 6 mm | 18.2 | 7.8 | 21.6 | −16 | 2.5 |
| 14 | 0.18 | 6 mm | 20.2 | 10.5 | 25.9 | −12.7 | 1.2 |
| 15 | 0.45 | 6 mm | 20.3 | 10.8 | 30 | −12.9 | 0 |
| 16 | — | 6 mm | 21.8 | 11.9 | 35.6 | −12.7 | −0.4 |

Examples 12 and 16 are further comparative examples illustrating prior art versions of glazing 10 which are not provided with coating 14. Examples 9 to 12 and 13 to 16 again clearly show that the presence of a low emissivity coating on a pane of the tinted glass in question has a minimal effect on the visible light transmission of the glazing (a maximum drop of 4.6 percentage points is observed at 5 mm and 3.6 percentage points at 6 mm) whilst both the TE and TSHT values of the coated glazings are lower (and in some examples a third lower) compared to a corresponding un-coated glazing.

Further alternatively glass pane 11 may be green glass which has a similar base glass composition as compositions 1 and 2 described previously, and a colourant portion comprising (by weight) 1.30% total iron (calculated as $Fe_2O_3$), 0.26% ferrous oxide (calculated as FeO), 128 ppm $CO_3O_4$, 80 ppm NiO and 7 ppm Se—hereinafter referred to as composition 3. This composition is similar to composition 2 previously described, thus if this glass were to form glazing 10, the properties of resultant glazing 10 would be similar to those measured and recorded in Table 2.

Figure 2:
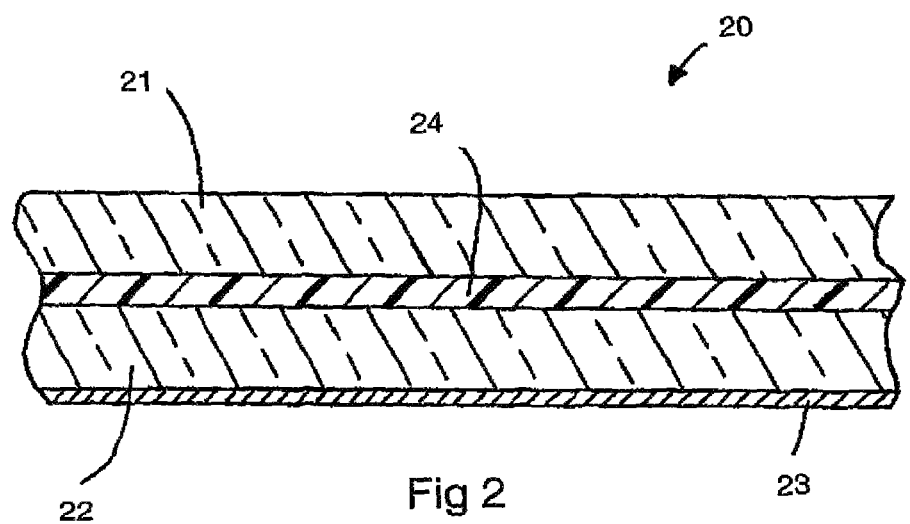
FIG. 2 is a cross sectional view through a laminated vehicle glazing according to the second aspect of the present invention in which the low emissivity coating is provided on surface 4.

The cross sectional view of FIG. 2 illustrates that laminated vehicle glazing 20 comprises outer glass ply 21, inner glass ply 22 and interlayer ply 24, in the form of a PVB sheet, which nominally has a thickness of 0.76 mm. Outer glass ply 21 is tinted glass and inner glass ply 22 is either tinted or clear glass (as described herein). When outer glass ply 21 alone is tinted, it is preferably of a composition chosen from composition 1, 2 or 3 described previously for glass pane 11; when both outer glass ply 21 and inner glass ply 22 are tinted, it is to the same composition for each, again preferably chosen from composition 1, 2 or 3 described previously for glass pane 11. For the avoidance of doubt, although outer glass ply 21 has been described as the glass ply that is tinted in the case where only one glass ply of glazing 20 is tinted, it is however possible that inner glass ply 22 could be tinted instead of outer glass ply 21.

In FIG. 2, surface 4 of glazing 20 (i.e. outer surface of inner glass ply 22) is provided with coating 23, which, as for glazing 10, may be directly or indirectly located on said surface. Interlayer ply 24 interleaves between outer glass ply 21 and inner glass ply 22, laminating the two glass plies together when all three are simultaneously subjected to a lamination process in an autoclave. The following tables illustrate non-limiting examples of laminated glazing 20 when it is comprised of various outer glass ply 21 and inner glass ply 22 composition combinations, and when it is laminated with various types of interlayer material. Thus, when coating 23 is a low emissivity coating having an emissivity value as shown in the Tables, laminated glazing 20 exhibits the properties listed at the glass thicknesses specified, wherein:

Table 3 represents the case where outer glass ply 21 and inner glass ply 22 are both tinted to the same colour according to composition 1 above, and interlayer ply 24 is either (a) clear PVB, (b) tinted PVB having 35% $LT_A$, (c) tinted PVB having 18% $LT_A$ or (d) an IR absorbing PVB as indicated (sheets of PVB are currently available from Solutia Inc., PO Box 66760, St. Louis, Mo. 63166-6760 USA), Table 4 is similar to Table 3 except in that outer glass ply 21 and inner glass ply 22 are both tinted to the same colour according to composition 2 above, Table 5 represents the case where outer glass ply 21 is tinted according to composition 1 above, inner glass ply 22 is clear glass (typically as described earlier), and interlayer ply 24 is either (a) clear PVB, (b) tinted PVB having 35% $LT_A$, (c) tinted PVB having 18% $LT_A$ or (d) an IR absorbing PVB as indicated, and Table 6 is similar to Table 5 except in that outer glass ply 21 is tinted according to composition 2 above.

TABLE 3

| Ex. | Thickness of outer glass ply 21 | Thickness of inner glass ply 22 | Interlayer ply 24 | ε | $LT_A$ (%) | TE (%) | TSHT (%) | a* | b* |
|---|---|---|---|---|---|---|---|---|---|
| 17 | 2.1 mm | 2.1 mm | a | 0.05 | 13.6 | 7 | 20.8 | −7.6 | 5.1 |
| 18 | 2.55 mm | 2.55 mm | a | 0.05 | 9.4 | 4.9 | 19.1 | −7.4 | 5 |
| 19 | 2.1 mm | 2.1 mm | a | 0.18 | 15.2 | 12.3 | 27 | −4 | 3.9 |
| 20 | 2.55 mm | 2.55 mm | a | 0.18 | 10.5 | 8.5 | 24 | −4.3 | 3.8 |
| 21 | 2.1 mm | 2.1 mm | a | 0.45 | 15.2 | 12.8 | 31.2 | −4.3 | 2.8 |
| 22 | 2.55 mm | 2.55 mm | a | 0.45 | 10.5 | 8.8 | 28.2 | −4.5 | 2.9 |
| 23 | 2.1 mm | 2.1 mm | a | — | 16.4 | 14.1 | 36.8 | −4 | 2.5 |
| 24 | 2.55 mm | 2.55 mm | a | — | 11.4 | 9.7 | 33.8 | −4.4 | 2.8 |
| 25 | 3.1 mm | 3.1 mm | b | 0.18 | 2.6 | 2.4 | 19.3 | −6.9 | 3.3 |
| 26 | 3.1 mm | 3.1 mm | b | — | 2.8 | 2.9 | 29 | −7 | 2.6 |
| 27 | 3.1 mm | 3.1 mm | c | 0.18 | 1.4 | 1.7 | 18.8 | −3.1 | 3.4 |
| 28 | 3.1 mm | 3.1 mm | c | — | 1.5 | 2.1 | 28.4 | −3.2 | 2.9 |
| 29 | 3.1 mm | 3.2 mm | d | 0.18 | 5.8 | 3.8 | 20.4 | −5.1 | 4.8 |
| 30 | 3.1 mm | 3.2 mm | d | — | 6.3 | 4.1 | 29.8 | −5.2 | 3.9 |

Examples 23, 24, 26, 28 and 30 are comparative examples illustrating prior art versions of laminated glazing 20 which do not include coating 20. Examples 17 to 24 in particular show that the presence of a low emissivity coating on an exposed surface of a laminated glazing according to the invention has a minimal effect on the visible light transmission of the glazing (a maximum drop of 2.8 percentage points is observed for 2×2.1 mm plies and 2 percentage points for 2×2.55 mm plies) whilst both the TE and TSHT values of the coated glazings are lower (and in some examples halved) compared to a corresponding un-coated glazing.

TABLE 4

| Ex. | Thickness of outer glass ply 21 | Thickness of inner glass ply 22 | Interlayer ply 24 | ε | $LT_A$ (%) | TE (%) | TSHT (%) | a* | b* |
|---|---|---|---|---|---|---|---|---|---|
| 31 | 2.1 mm | 2.1 mm | a | 0.05 | 27.6 | 12.3 | 25.2 | −14.6 | 3.3 |
| 32 | 2.55 mm | 2.55 mm | a | 0.05 | 22.3 | 9.7 | 23.1 | −15.4 | 3.1 |
| 33 | 2.1 mm | 2.1 mm | a | 0.18 | 30.8 | 17.6 | 31.4 | −10.5 | 1.8 |
| 34 | 2.55 mm | 2.55 mm | a | 0.18 | 24.9 | 13.5 | 28.1 | −11.8 | 1.6 |
| 35 | 2.1 mm | 2.1 mm | a | 0.45 | 30.9 | 18.1 | 35.3 | −10.8 | 0.4 |
| 36 | 2.55 mm | 2.55 mm | a | 0.45 | 24.9 | 13.8 | 32.1 | −12 | 0.3 |
| 37 | 2.1 mm | 2.1 mm | a | — | 33 | 20 | 41 | −10.7 | 0 |
| 38 | 2.55 mm | 2.55 mm | a | — | 27 | 15 | 37.7 | −11.9 | 0 |
| 39 | 3.1 mm | 3.1 mm | b | 0.18 | 8.1 | 4.4 | 20.9 | −15 | 1.6 |
| 40 | 3.1 mm | 3.1 mm | b | — | 8.7 | 5 | 30.5 | −15.1 | 0.5 |
| 41 | 3.1 mm | 2.55 mm | c | 0.18 | 4.7 | 3.2 | 20 | −8.8 | 2.3 |
| 42 | 3.1 mm | 2.55 mm | c | — | 5.1 | 3.8 | 29.6 | −8.9 | 1.4 |
| 43 | 3.1 mm | 3.1 mm | d | 0.18 | 18 | 8.2 | 24.1 | −13.5 | 2.6 |
| 44 | 3.1 mm | 3.1 mm | d | — | 19.4 | 9 | 33.3 | −13.7 | 1.1 |

Examples 37, 38, 40, 42 and 44 are comparative examples illustrating prior art versions of laminated glazing 20 which do not include coating 20. Examples 31 to 38 in particular show that the presence of a low emissivity coating on an exposed surface of a laminated glazing according to the invention has a minimal effect on the visible light transmission of the glazing (a maximum drop of 5.4 percentage points is observed for 2×2.1 mm plies and 4.7 percentage points for 2×2.55 mm plies) whilst both the TE and TSHT values of the coated glazings are lower (and in some examples over one third lower) compared to a corresponding un-coated glazing.

TABLE 5

| Ex. | Thickness of outer glass ply 21 | Thickness of inner glass ply 22 | Interlayer ply 24 | ε | $LT_A$ (%) | TE (%) | TSHT (%) | a* | b* |
|---|---|---|---|---|---|---|---|---|---|
| 45 | 3.1 mm | 2.3 mm | a | 0.05 | 20.5 | 10.5 | 23.4 | −8.1 | 5.3 |
| 46 | 3.1 mm | 2.3 mm | a | 0.18 | 22.7 | 18 | 31.5 | −4.1 | 3.8 |
| 47 | 3.1 mm | 2.3 mm | a | 0.45 | 22.5 | 18.6 | 35.5 | −4.3 | 2.7 |
| 48 | 3.1 mm | 2.3 mm | a | — | 24.3 | 20.5 | 41.3 | −4 | 2.3 |
| 49 | 3.1 mm | 2.3 mm | b | 0.18 | 9.3 | 9 | 24.4 | −8.6 | 3.5 |
| 50 | 3.1 mm | 2.3 mm | b | — | 10.1 | 10.6 | 34.4 | −8.7 | 2.3 |
| 51 | 3.1 mm | 2.3 mm | c | 0.18 | 4.9 | 6.3 | 22.3 | −3.3 | 4.1 |
| 52 | 3.1 mm | 2.3 mm | c | — | 5.3 | 7.5 | 32.3 | −3.3 | 3.2 |
| 53 | 3.1 mm | 2.3 mm | d | 0.18 | 21.1 | 13.8 | 28.3 | −5 | 5.3 |
| 54 | 3.1 mm | 2.3 mm | d | — | 22.7 | 15 | 37.3 | −5 | 3.9 |

Examples 48, 50, 52 and 54 are comparative examples illustrating prior art versions of laminated glazing 20 which do not include coating 20. Examples 45 to 48 in particular again show that the presence of a low emissivity coating on an exposed surface of a laminated glazing according to the invention has a minimal effect on the visible light transmission of the glazing (a maximum drop of 3.8 percentage points is observed when interlayer ply (a) is used) whilst both the TE and TSHT values of the coated glazings are lower (and in some examples halved) compared to a corresponding un-coated glazing.

Comparing examples 45 to 47 and comparative example 24, it will seem that, using the invention with a tinted outer glass ply and a clear inner glass ply, a vehicle glazing with a much higher light transmission ($LT_A$>20%) may be achieved without significant loss of solar performance over that achieved with two dark tinted panes without a low emissivity coating. Indeed, when a low emissivity coating with an emissivity less than 0.2 is employed (examples 45 to 46), with a very much improved solar performance.

TABLE 6

| Ex. | Thickness of outer glass ply 21 | Thickness of inner glass ply 22 | Interlayer ply 24 | ε | $LT_A$ (%) | TE (%) | TSHT (%) | a* | b* |
|---|---|---|---|---|---|---|---|---|---|
| 55 | 2.55 mm | 2.3 mm | a | 0.05 | 40.3 | 18.6 | 30 | −12.9 | 4.1 |
| 56 | 2.55 mm | 2.3 mm | a | 0.18 | 45.1 | 28.9 | 40.1 | −8 | 2.3 |
| 57 | 2.55 mm | 2.3 mm | a | 0.45 | 45.1 | 29.7 | 43.8 | −8.4 | 0.8 |
| 58 | 2.55 mm | 2.3 mm | a | — | 48.3 | 32.6 | 49.8 | −8 | 0.3 |
| 59 | 3.1 mm | 2.3 mm | b | 0.18 | 16.5 | 11.4 | 26.4 | −13.7 | 2.2 |
| 60 | 3.1 mm | 2.3 mm | b | — | 17.8 | 13.2 | 36.2 | −13.9 | 0.8 |
| 61 | 3.1 mm | 2.3 mm | c | 0.18 | 8.6 | 7.5 | 23.3 | −6.9 | 3.2 |
| 62 | 3.1 mm | 2.3 mm | c | — | 9.2 | 8.8 | 33.2 | −7 | 2.1 |
| 63 | 3.1 mm | 2.3 mm | d | 0.18 | 37 | 19.4 | 33 | −10.1 | 3.7 |
| 64 | 3.1 mm | 2.3 mm | d | — | 40.4 | 21.2 | 41.8 | −10.1 | 1.8 |

Examples 58, 60, 62 and 64 are comparative examples illustrating prior art versions of laminated glazing 20 which do not include coating 23. Examples 55 to 58 in particular show that the presence of a low emissivity coating on an exposed surface of a laminated glazing according to the invention has a minimal effect on the visible light transmission of the glazing (a maximum drop of 8 percentage points is observed when interlayer ply (a) is used) whilst both the TE and TSHT values of the coated glazings are lower (and in some examples one third lower) compared to a corresponding un-coated glazing.

The examples of laminated glazings listed in Tables 3 to 6 are best suited for use as vehicle side glazings and roof glazings; none are suitable for use as vehicle windscreens because none exhibit visible light transmission above 70% (in fact, all exhibit $LT_A$ of less than 50%). However, examples of laminated glazings which are suitable for use as vehicle windscreens are listed in Table 7 below. Outer glass ply 21 and inner glass ply 22 of these glazings 20 may each be clear glass (for example as described earlier), or green tinted glass having a similar base glass composition as compositions 1, 2 and 3 described previously and a colourant portion comprising (by weight) 0.6% total iron (calculated as $Fe_2O_3$) and 0.13% ferrous oxide (calculated as FeO)—hereinafter referred to as composition 4—or 0.9% total iron (calculated as $Fe_2O_3$) and 0.19% ferrous oxide (calculated as FeO)—hereinafter referred to as composition 5. Interlayer ply 24 is in the form of a clear PVB sheet which nominally has a thickness of 0.76 mm. Again, surface 4 of glazing 20 (i.e. outer surface of inner glass ply 22) is provided with coating 23 which, as for glazing 10, may be directly or indirectly located on said surface. When coating 23 is a low emissivity coating having an emissivity as shown in Table 7, laminated glazing 20 exhibits the properties listed in Table 7 at the glass thicknesses and compositions specified.

that the overall value of the power radiated by the coating plus DSHT (a measure of the heat energy actually entering a vehicle which is fitted with a laminated glazing according to the invention) decreases when a coating is present on the glazing compared to when a coating is absent.

Figure 3:
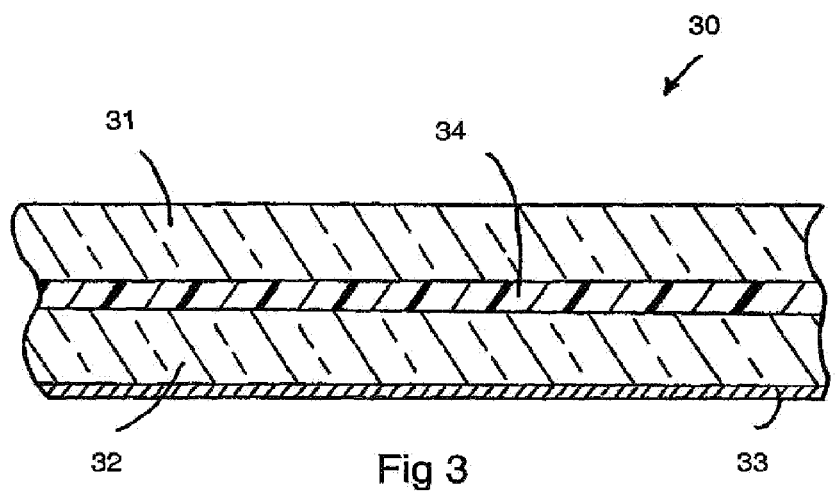
FIG. 3 is a cross sectional view through a laminated vehicle glazing according to the third aspect of the present invention in which the low emissivity coating is provided on surface 4.

FIG. 3 illustrates a laminated vehicle glazing 30 comprising outer glass ply 31, inner glass ply 32 and interlayer ply 34, in the form of a body-tinted PVB sheet which nominally has a thickness of 0.76 mm (although it may be used in a thickness anywhere between 0.25 mm and 1.6 mm). Both outer glass ply 31 and inner glass ply 32 are clear glass (although it is possible that one or both plies of glass could be tinted, for example green tinted according to composition 4 or 5 described previously). Surface 4 of glazing 30 is provided with coating 33, which as for glazings 10 and 20, may be directly or indirectly located on said surface. Interlayer ply 34 comprises PVB which is tinted and includes an infra-red absorbing material, for example lanthanum hexaboride. At a thickness of 0.76 mm interlayer ply 34 alone exhibits visible light transmission of 20.6%, TE of 13.5%, TSHT of 37.1% and has a* and b* values of −9.8 and 0.7 respectively when laminated with two pieces of clear glass as described earlier. The following table, Table 8, illustrates non-limiting examples of laminated glazing 30 when it comprises two 2.1 mm clear glass plies (for example according to a composition hereinbefore described), an interlayer ply at two different thicknesses and a low emissivity coating having an emissivity value as shown.

TABLE 7

| Ex. | Thickness & Composition Number (x) of outer glass ply 21 | Thickness & Composition Number (x) of inner glass ply 22 | ε | $LT_A$ (%) | TE (%) | DSHT (%) | $P_R$ + DSHT (W m$^{-2}$ K$^{-1}$) | a* | b* |
|---|---|---|---|---|---|---|---|---|---|
| 65 | 2.1 mm (x = 4) | 2.1 mm (x = 4) | 0.18 | 71.8 | 45.6 | 43.8 | 288.491 | −7.1 | 3.9 |
| 66 | 2.6 mm (x = 5) | 2.1 mm (x = 4) | — | 70.9 | 43.6 | 42.8 | 347.53 | −9 | 1.7 |
| 67 | 2.1 mm (x = 4) | 2.3 mm (x = clear) | 0.18 | 76.1 | 56.6 | 54.5 | 349.23 | −4.3 | 3.1 |
| 68 | 2.1 mm (x = 4) | 2.1 mm (x = 4) | — | 77.3 | 51.3 | 49.7 | 381.506 | −7 | 1.5 |

Examples 66 and 68 are comparative examples which illustrate prior art versions of laminated glazing 20 which are not provided with coating 23. In Table 7, DSHT is measured at Air Mass 1.5 (simulating rays from the sun incident at an angle of 37° to the horizontal) over the wavelength range 300 to 2500 nm at 5 nm, 10 nm and 50 nm intervals. The power radiated by the coating ("$P_R$") on the glazing plus DSHT is calculated for the side of the glazing on which the coating is located. For these four examples, the ambient air temperature on the uncoated side of the glazing was measured to be 30° C., whilst that on the coated side of the glazing was measured to be 20° C. The solar power incident on the uncoated side of the glazing (representing sunlight incident on surface 1 of laminated glazing installed as a vehicle windscreen) was measured to have a value of 600 Watts per square meter per Kelvin (W m$^{-2}$ K$^{-1}$). Examples 65 and 66 illustrate laminated glazings which are suitable for use as windscreens in USA (where the $LT_A$ requirement is 70% or greater) and examples 67 and 68 are suitable for use as windscreens in Europe (where the $LT_A$ requirement is 75% or greater). In each case, it is clear

TABLE 8

| Ex. | Thickness of interlayer ply 34 | ε | $LT_A$ (%) | TE (%) | TSHT (%) | a* | b* |
|---|---|---|---|---|---|---|---|
| 69 | 0.76 mm | 0.05 | 16.8 | 6.4 | 20.4 | −13.4 | 3.6 |
| 70 | 0.76 mm | 0.18 | 18.6 | 10.2 | 25.8 | −10.4 | 2.5 |
| 71 | 0.76 mm | 0.45 | 18.7 | 11.2 | 30.6 | −10.5 | 1.3 |
| 72 | 0.76 mm | — | 20.1 | 12.6 | 36.4 | −10.4 | 0.9 |
| 73 | 0.4 mm | 0.05 | 35 | 14.9 | 26.9 | −12.1 | 4.3 |
| 74 | 0.4 mm | 0.18 | 39.1 | 24.8 | 37.2 | −7.6 | 2.7 |
| 75 | 0.4 mm | 0.45 | 39.1 | 26.3 | 42 | −7.9 | 1.3 |
| 76 | 0.4 mm | — | 42.1 | 29.2 | 48.1 | −7.6 | 0.8 |

Examples 72 and 76 are comparative examples illustrating prior art versions of laminated glazing 30 which do not include coating 33. Examples 69 to 72 and 73 to 76 clearly show that the presence of a low emissivity coating on an exposed surface of a laminated glazing according to the invention has a minimal effect on the visible light transmission of the glazing (a maximum drop of 3.3 percentage points is observed when the interlayer ply is 0.76 mm thick and 7.1 percentage points when the interlayer ply is 0.4 mm thick) whilst both the TE and TSHT values of the coated glazings are lower (and in some examples halved) compared to a corresponding un-coated glazing.

What is claimed is:

1. A vehicle glazing configured to be mounted in a vehicle comprising:
    only one single pane of glass, wherein the single pane of glass is a single pane of tinted glass,
    the single pane of tinted glass possessing an interior surface which faces a vehicle interior when the vehicle glazing is mounted in a vehicle,
    the single pane of tinted glass having a nickel content, calculated as NiO, more than 55 ppm, a colourant portion including 1.0 to 1.8% (by weight of the glass) of total iron (calculated as $Fe_2O_3$), 100 to 270 ppm by weight of cobalt oxide (calculated as $Co_3O_4$) and selenium (calculated as Se) in an amount less than 20 ppm by weight, and a low emissivity coating directly contacting the interior surface of the pane, and
    the glazing has a visible light transmission of 28% or less.

2. A vehicle glazing as claimed in claim 1, wherein the low emissivity coating has an emissivity in the range from 0.05 to 0.45 determined according to EN 12898.

3. A vehicle glazing as claimed in claim 1, wherein the low emissivity coating includes a transparent conductive oxide.

4. A vehicle glazing as claimed in claim 3, wherein the low emissivity coating further includes a dopant.

5. A vehicle glazing as claimed in claim 1, wherein the pane of tinted glass is toughened glass.

6. A vehicle glazing as claimed in claim 1, wherein the pane of tinted glass has a thickness in the range from 1.5 mm to 8 mm.

7. A vehicle glazing as claimed in claim 1, wherein the pane of tinted glass includes 0.05 to 1.6% by weight of ferrous oxide (calculated as FeO).

8. A vehicle glazing as claimed in claim 1, wherein the pane of tinted glass includes up to 500 ppm by weight of nickel oxide (calculated as NiO).

9. A vehicle glazing as claimed in claim 1, having a transmitted energy of 30% or less.

10. A vehicle glazing as claimed in claim 1, wherein the glazing is a roof glazing.

11. A vehicle glazing configured to be mounted in a vehicle, the vehicle glazing comprising:
    only one single pane of glass, wherein the single pane of glass is a single pane of body-tinted glass;
    the single pane of body-tinted glass possessing an interior surface which faces a vehicle interior when the vehicle glazing is mounted in a vehicle;
    the single pane of body-tinted glass having a nickel content, calculated as NiO, more than 55 ppm, a colourant portion including 1.3 to 1.6% (by weight of the glass) of total iron (calculated as $Fe_2O_3$), 150 to 230 ppm by weight of cobalt oxide (calculated as $Co_3O_4$) and selenium, wherein the selenium (calculated as Se) is present in an amount less than 20 ppm by weight;
    a metal oxide low emissivity coating directly contacting the interior surface of the pane; and
    the vehicle glazing possessing a visible light transmission of 36% or less measured according to C.I.E. Illuminant A.

12. A vehicle glazing as claimed in claim 11, wherein the low emissivity coating has an emissivity in the range from 0.05 to 0.45 determined according to EN 12898.

13. A vehicle glazing as claimed in claim 11, wherein the low emissivity coating includes a transparent conductive oxide.

14. A vehicle glazing as claimed in claim 11, wherein the low emissivity coating includes a dopant.

15. A vehicle glazing as claimed in claim 11, wherein the pane of tinted glass is toughened glass.

16. A vehicle glazing as claimed in claim 11, wherein the pane of tinted glass includes a nickel content (calculated as NiO) more than 100 ppm and up to 500 ppm.

17. A vehicle glazing as claimed in claim 16, wherein the glazing has a transmitted energy of 30% or less measured at Air Mass 2, ISO 9050.

18. A vehicle glazing as claimed in claim 16, wherein the glazing has a transmitted energy of 20% or less measured at Air Mass 2, ISO 9050.

19. A vehicle glazing as claimed in claim 11, wherein the glazing has a transmitted energy of 30% or less measured at Air Mass 2, ISO 9050.

20. A vehicle glazing as claimed in claim 11, wherein the glazing has a transmitted energy of 20% or less measured at Air Mass 2, ISO 9050.

* * * * *